(12) United States Patent
Alla et al.

(10) Patent No.: US 11,176,734 B1
(45) Date of Patent: Nov. 16, 2021

(54) GPU HARDWARE-BASED DEPTH BUFFER DIRECTION TRACKING

(71) Applicant: QUALCOMM Incorporated, San Diego, CA (US)

(72) Inventors: Srihari Babu Alla, San Diego, CA (US); Adimulam Ramesh Babu, San Diego, CA (US); Jonnala Gadda Nagendra Kumar, San Diego, CA (US); Avinash Seetharamaiah, San Diego, CA (US); Tao Wang, Sunnyvale, CA (US); Xuefeng Tang, San Diego, CA (US); Thomas Edwin Frisinger, Shrewsbury, MA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/064,188

(22) Filed: Oct. 6, 2020

(51) Int. Cl.
*G06T 15/40* (2011.01)
*G06T 15/00* (2011.01)

(52) U.S. Cl.
CPC .......... *G06T 15/405* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,751,291 | A | * | 5/1998 | Olsen .................... G06T 15/405 345/422 |
| 6,462,743 | B1 | * | 10/2002 | Battle ................. G06F 15/8053 345/506 |
| 7,068,272 | B1 | * | 6/2006 | Voorhies ............... G06T 15/005 345/422 |
| 2013/0120381 | A1 | * | 5/2013 | Lau ........................ G09G 5/363 345/423 |
| 2015/0097831 | A1 | * | 4/2015 | Doffinger .............. G06T 15/405 345/422 |
| 2016/0098856 | A1 | * | 4/2016 | Broadhurst ........... G06T 15/005 345/422 |
| 2018/0349315 | A1 | * | 12/2018 | Heggelund ......... G06F 15/7882 |
| 2021/0065437 | A1 | * | 3/2021 | Brkic ..................... G06T 11/40 |

\* cited by examiner

*Primary Examiner* — Robert Bader
(74) *Attorney, Agent, or Firm* — Campbell C. Chiang; Patterson & Sheridan, LLP

(57) ABSTRACT

The present disclosure relates to methods and apparatus for graphics processing. An example method generally includes receiving, at a graphics processing unit (GPU), a plurality of commands corresponding to a plurality of draws across a frame, each of the plurality of commands indicating a depth test direction with respect to a low-resolution depth (LRZ) buffer for the corresponding draw. The method generally includes maintaining, at the GPU, a LRZ status buffer to store a corresponding depth test direction for a first command in time of the plurality of commands processed by the GPU. The method generally includes disabling, at the GPU, use of the LRZ buffer for depth testing for any of the plurality of commands remaining unprocessed after processing a command of the plurality of commands having a different depth test direction than the corresponding depth test direction stored in the LRZ status buffer.

33 Claims, 4 Drawing Sheets

GPU HARDWARE-BASED DEPTH BUFFER DIRECTION TRACKING

TECHNICAL FIELD

The present disclosure relates generally to processing systems and, more particularly, to one or more techniques for graphics processing.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, an apparatus, and a computing device are provided.

In certain aspects, an example method generally includes receiving, at a graphics processing unit (GPU), a plurality of commands corresponding to a plurality of draws across a frame, each of the plurality of commands indicating a depth test direction with respect to a low-resolution depth (LRZ) buffer for the corresponding draw. The method generally includes maintaining, at the GPU, a LRZ status buffer to store a corresponding depth test direction for a first command in time of the plurality of commands processed by the GPU. The method generally includes disabling, at the GPU, use of the LRZ buffer for depth testing for any of the plurality of commands remaining unprocessed after processing a command of the plurality of commands having a different depth test direction than the corresponding depth test direction stored in the LRZ status buffer.

In certain aspects, an example apparatus generally includes a LRZ buffer, a LRZ status buffer, and a GPU. The GPU may be configured to receive a plurality of commands corresponding to a plurality of draws across a frame, each of the plurality of commands indicating a depth test direction with respect to the LRZ buffer for the corresponding draw. The GPU may be configured to maintain the LRZ status buffer to store a corresponding depth test direction for a first command in time of the plurality of commands processed by the GPU. The GPU may be configured to disable use of the LRZ buffer for depth testing for any of the plurality of commands remaining unprocessed after processing a command of the plurality of commands having a different depth test direction than the corresponding depth test direction stored in the LRZ status buffer.

In certain aspects, an example computing device generally includes a central processing unit (CPU), a display, a LRZ buffer, a LRZ status buffer, and a GPU. The GPU is configured to receive a plurality of commands from the CPU, the plurality of commands corresponding to a plurality of draws across a frame for display on the display, each of the plurality of commands indicating a depth test direction with respect to the LRZ buffer for the corresponding draw. The GPU is configured to maintain the LRZ status buffer to store a corresponding depth test direction for a first command in time of the plurality of commands processed by the GPU. The GPU is configured to disable use of the LRZ buffer for depth testing for any of the plurality of commands remaining unprocessed after processing a command of the plurality of commands having a different depth test direction than the corresponding depth test direction stored in the LRZ status buffer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
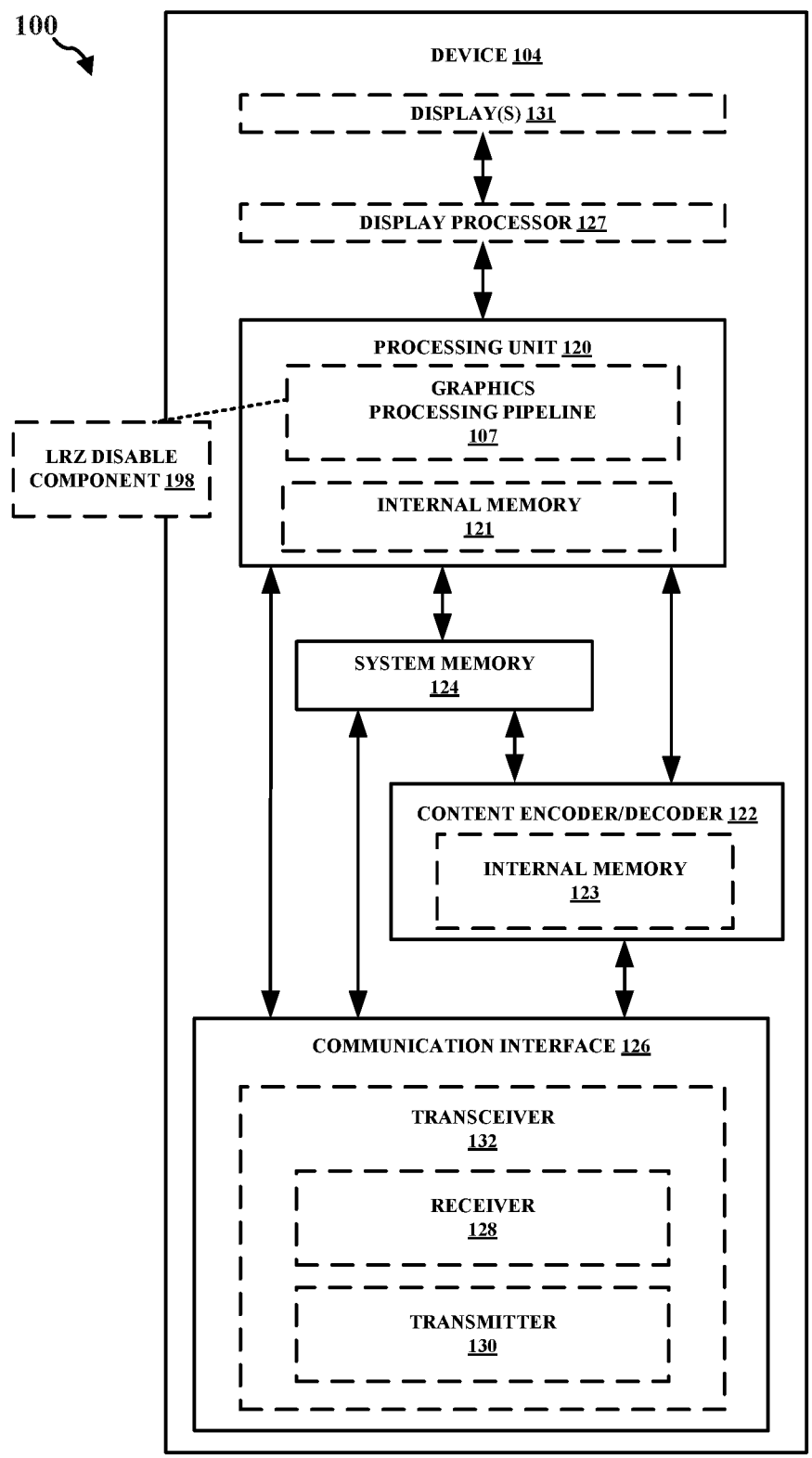
FIG. 1 is a block diagram that illustrates an example content generation system, in accordance with certain aspects of the present disclosure.

Conventionally, a software driver of a graphics processing system may be responsible for handling some aspects of graphics processing, including enabling/disabling a low resolution (LRZ) depth buffer for LRZ depth testing based on direction testing. In certain aspects, a frame to be displayed is divided into tiles (or bins), such as of a fixed size. Each tile (or bin) may have a corresponding entry in a LRZ depth buffer, the entry indicating the farthest depth value for the tile/bin. When a GPU processes draws commands for elements (e.g., triangles) within a bin for rendering, depth testing can be performed to determine whether or not the element is visible (e.g., if it is overlapped by another element or not) and therefore whether or not the element needs to be rendered and/or whether or not the draw command processed when the draw command indicates that depth testing is enabled. For example, the depth value of the draw command may be compared against the depth value stored in the LRZ depth buffer, and if visible, the element is rendered.

The draw command further indicates a depth test direction with respect to the LRZ buffer for the corresponding draw. If the depth test direction changes between subsequent draws in a bin, the use of the LRZ depth buffer may need to be disabled, as the change in direction means that the LRZ depth buffer can no longer be used to compare whether further draws are visible or not. Conventionally, the software driver keeps track of changes in depth test direction, and includes in the draw command to the GPU an indication of whether use of the LRZ depth buffer is enabled for disabled.

However, many GPUs include multiple threads for processing draw commands sent to the GPU by the driver (e.g., accessed by multithreaded application programming interfaces (APIs)). For example, the GPU may pull draw commands from multiple different command buffers in parallel. Accordingly, the driver does not necessarily have a priori information as to the order in which certain draw commands will be processed by the GPU, and therefore, may not be able to predict when to enable/disable use of the LRZ depth buffer.

According to aspects discussed herein, determination of whether to enable/disable use of the LRZ depth buffer may instead performed by a GPU based on the order in which it actually processes the commands. Accordingly, the driver may no longer need to track depth buffer direction if the GPU is the entity handling the depth buffer direction tracking, and may always just indicate that LRZ depth buffer is enabled in draw commands.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, or a single device having multiple pipelines, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a low resolution (LRZ) disable component 198 configured to disable use of a LRZ buffer for depth testing. The LRZ disable component 198 can also be configured to receive a plurality of commands corresponding to a plurality of draws across a frame, each of the plurality of commands indicating a depth test direction with respect to a LRZ buffer for the corresponding draw. The LRZ disable component 198 can also be configured to maintain a LRZ status buffer to store a corresponding depth test direction for a first command in time of the plurality of commands processed by the GPU. The LRZ disable component 198 can be configured to disable use of the LRZ buffer for depth testing for any of the plurality of commands remaining unprocessed after processing a command of the plurality of commands having a different depth test direction than the corresponding depth test direction stored in the LRZ status buffer. The LRZ disable component 198 can also be configured to compare a corresponding depth test direction of each of one or more commands including the command to the corresponding depth test direction stored in the LRZ status buffer, wherein disabling the use of the LRZ buffer is in response to the comparing. The LRZ disable component 198 can also be configured to disable the use of the LRZ buffer by disabling the use of the LRZ buffer for the command and each of the plurality of commands processed subsequent in time to the command.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular hardware component (e.g., a GPU), but, in further embodiments, can be performed using other hardware components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
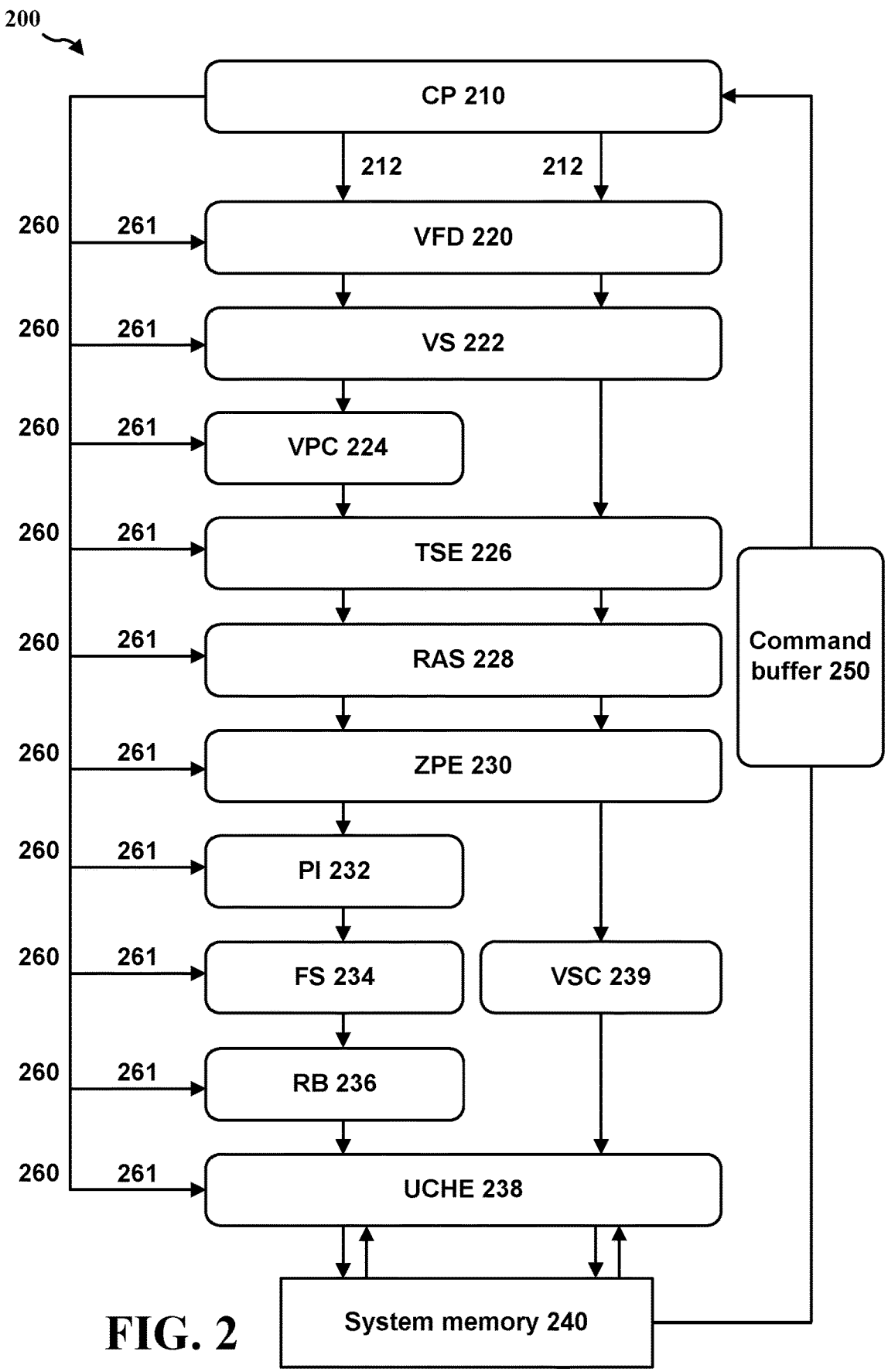
FIG. 2 illustrates an example GPU, in accordance with certain aspects of the present disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, virtually split cache (VSC) 239, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles, also referred to as bins. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects, GPUs can apply the drawing or rendering process to different bins or tiles. For instance, a GPU can render to one bin, and then perform all the draws for the primitives or pixels in the bin. Additionally, a GPU can render to another bin, and perform the draws for the primitives or pixels in that bin. Therefore, in some aspects, there might be a small number of bins (e.g., four bins) that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
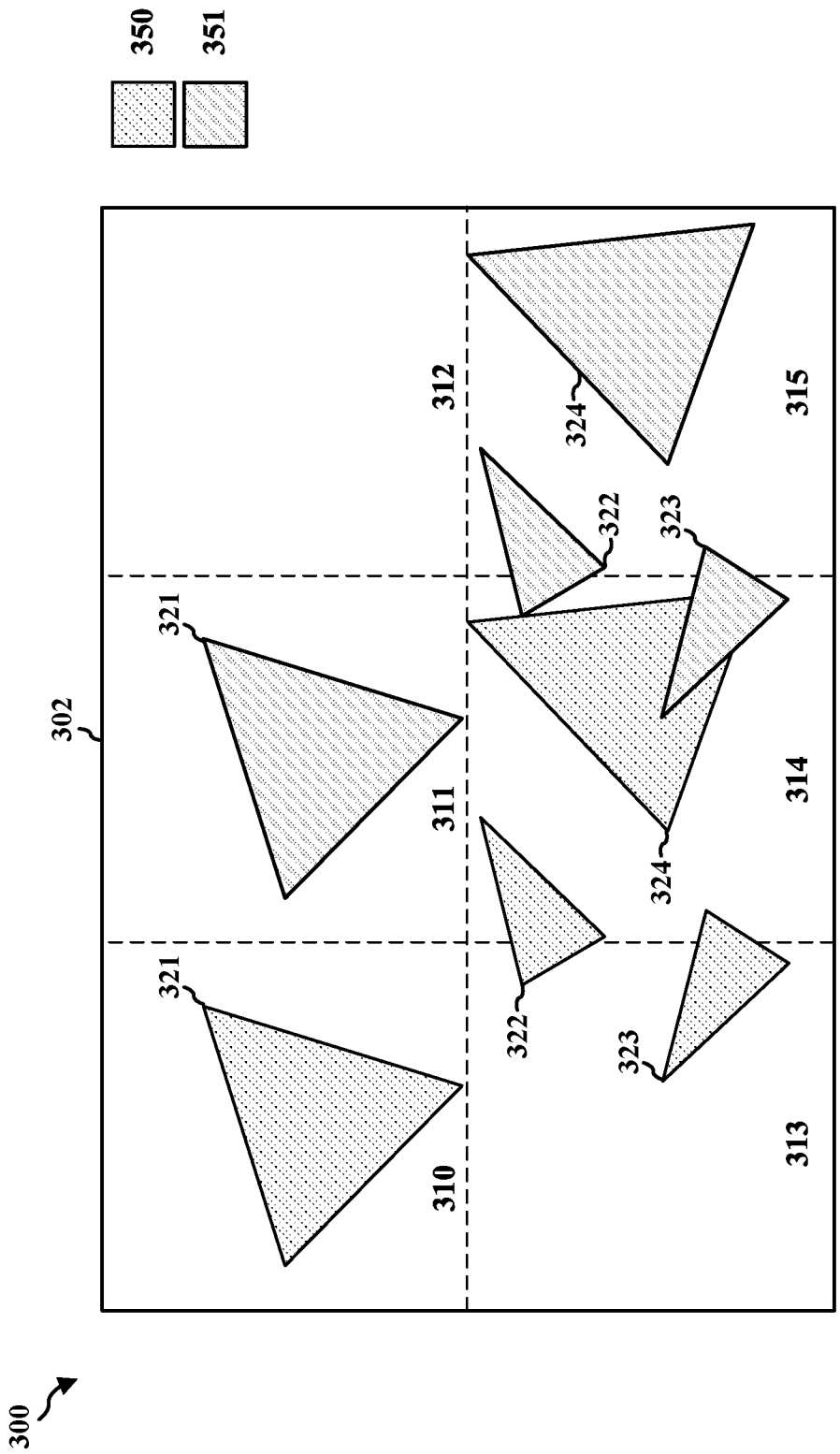
FIG. 3 illustrates an example image or surface, in accordance with certain aspects of the present disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., once for each bin.

As indicated above, GPUs can cycle through each draw call in one bin and perform the draw calls that are visible. In some aspects, draw calls that fall into a given bin are considered live draw calls, while draw calls that fall outside the bin are considered dead draw calls. Efficiently skipping dead draw calls can lower the hardware overhead caused by rendering a scene multiple times.

For each function of the GPU, there can be an assigned group, i.e., a workload group or graphics state group. The workload or graphics state groups can also include a corresponding state or context state. So each of the workload or graphics state groups that correspond to a specific state or context state can perform a function of the GPU. For example, a depth state can be one workload or graphics state group, a blend state can be another workload or graphics state group, and a fragment shader state can be another workload or graphics state group.

For each bin or tile, the GPU can execute all the workload or graphics state groups and fetch each live draw for that particular bin. Also, a command stream can be fetched by the GPU for each bin rendering. Additionally, as indicated above, in the visibility pass, the GPU can process the command stream. The GPU can also determine which draw call is visible in a particular bin during the visibility pass.

During the visibility pass, the GPU can also build a set of state information or context state information for each graphics state group in each draw call. In some aspects, the GPU can also build the full set of state information for each draw call when the CPU or software provides incremental or changing states or context states. Accordingly, the CPU can communicate these incremental states or context states for the workload or graphics state groups during the visibility pass. In some aspects, the command stream can be sent before each draw call is performed, e.g., in the visibility pass. As such, the command stream can be transmitted in the visibility pass before the GPU renders or draws.

In some instances, the CPU or software can build or write a full state or context state for each graphics state group between draw calls. By doing so, the CPU can help the GPU or hardware skip to the next draw call, instead of fetching the command stream for dead draw calls. Thus, in some aspects, the CPU can build or write a full set of state information for each graphics state group whether or not the state or context state for a particular graphics state group has changed. For example, if draw calls 1-3 are dead draw calls, in order to jump from draw call 0 to draw call 4, the CPU or software may build the full set of state information for each graphics state group between the draw calls.

In order to build the full set of state information for each graphics state group, the CPU may utilize the graphics state of each graphics state group, e.g., context registers, constants, shaders, and resource descriptors. Indeed, in some aspects, each draw call may contain a complete set of context state information, which can add considerable driver overhead.

As stated above, the workload or graphics state groups can include constants, vertex shaders, fragment shaders, geometry shaders, context registers, fetchers, resource descriptors, blend states, data states, depth states, etc. The amount of workload or graphics state groups can be any appropriate number, e.g., 8, 16, 32, or 64. Further, each workload or graphics state group can correspond to a particular state or context state, e.g., performed at the GPU. In some aspects, the CPU can instruct the GPU on how to divide its workload into different workload or graphics state groups. The GPU can then process these different workload or graphics state groups. In some aspects, the GPU may not have knowledge regarding which group corresponds to a particular state or context state.

Example LRZ Depth Direction Tracking at a GPU

The present disclosure relates generally to processing systems and, more particularly, to one or more techniques for graphics processing. For example, as discussed, by using a graphics processing unit (GPU) to handle low resolution (LRZ) depth direction tracking, use of a LRZ depth buffer for LRZ depth testing can be enabled/disabled effectively, even in a multithreaded environment.

LRZ depth testing is a feature that allows a GPU to reject non-visible pixels early in image processing pipeline at an increased rate with generally improved performance. As depth testing happens at a coarse level, in some corner cases, LRZ depth testing is not possible. For example, LRZ depth testing may not be available whenever there is a depth test direction change with a depth write bit enabled. Usually, a software driver tracks the depth direction changes across one or more draws of a command to determine whether to enable or disable the LRZ depth testing (e.g., via a LRZEn bit, as shown below). In Example 1 below, as the driver tracks the LRZ buffer direction of each of the draws in the order of execution. In particular, the driver detects the direction change at draw4 (e.g., the direction switches from LESS to GREATER) and disables the LRZ (e.g., LRZEn=0) for the rest of the rendering.

Example 1

Draw1: Direction is LESS, LRZEn=1 LRZWriteEn=1; depthWrites=1;
Draw2: Direction is LESS, LRZEn=1 LRZWriteEn=1; depthWrites=1;
Draw3: Direction is LESS, LRZEn=1 LRZWriteEn=0; depthWrites=0;
Draw4: Direction is GREATER, LRZEn=0 LRZWriteEn=0; depthWrites=1;
Draw5: Direction is LESS, LRZEn=0 LRZWriteEn=0; depthWrites=1;
Draw6: Direction is LESS, LRZEn=0 LRZWriteEn=0; depthWrites=0;

However, with the advent of next-generation processors and/or multi-threading graphics application programming interfaces (APIs), the driver may not know the execution order of the draws while recording the draws into various command buffers. For example, as shown below in Examples 2 and 3, a driver may have two different command buffers, where one may be submitted before the other. In Example 2, if command buffer 1 is submitted before command buffer two, the LRZEn bit will be programmed similar to the above Example 1. However, if command buffer 2 is submitted ahead of command buffer 1 as shown in Example 3, the LRZ will not be enabled (e.g., LRZEn=0) for the draws in command buffer 1 or for draws 4 and 5 of command buffer 2. The LRZEn of command buffer 1 is set to 0 since there was a buffer direction change in previous command buffer (command buffer 2). Because of this uncertainty, the driver disables the LRZ depth testing (e.g., for secondary command buffers, depth load cases, etc.) to avoid unexpected renderings (e.g., depth rejects).

Example 2

Command Buffer 1:
Draw1: Direction is LESS, LRZEn=1 LRZWriteEn=1; depthWrites=1;
Draw2: Direction is LESS, LRZEn=1 LRZWriteEn=1; depthWrites=1;
Draw3: Direction is LESS, LRZEn=1 LRZWriteEn=0; depthWrites=0;
Command Buffer 2:
Draw4: Direction is GREATER, LRZEn=0 LRZWriteEn=0; depthWrites=1;
Draw5: Direction is LESS, LRZEn=0 LRZWriteEn=0; depthWrites=1;
Draw6: Direction is LESS, LRZEn=0 LRZWriteEn=0; depthWrites=0;

Example 3

Command Buffer 2:
Draw4: Direction is GREATER, LRZEn=1 LRZWriteEn=1; depthWrites=1;
Draw5: Direction is LESS, LRZEn=0 LRZWriteEn=0; depthWrites=1;
Draw6: Direction is LESS, LRZEn=0 LRZWriteEn=0; depthWrites=0;
Command Buffer 1:
Draw1: Direction is LESS, LRZEn=0 LRZWriteEn=0; depthWrites=1;
Draw2: Direction is LESS, LRZEn=0 LRZWriteEn=0; depthWrites=1;
Draw3: Direction is LESS, LRZEn=0 LRZWriteEn=0; depthWrites=0;

Accordingly, certain aspects beneficially track the direction of the depth buffer with the GPU instead of the driver to enable/disable the LRZ depth testing whenever the GPU detects a depth buffer direction change. In some cases, the GPU may store the direction of the depth buffer in a (e.g., additional smaller) buffer (e.g., a status buffer) upon encountering the first draw in time for a given frame (e.g., a given bin of a given frame) with depth writes enabled. The GPU may then compare the other draws' depth direction against the direction stored in the status buffer, then decide to allow/disallow LRZ depth testing on a per-draw draw basis and, in some cases, disable the LRZ for subsequent draws in the given frame (e.g., given bin of the frame) based on detecting a depth buffer direction change (e.g., LESS to GREATER or GREATER to LESS). Thus, certain aspects herein allow the driver to no longer need to track the direction depth for draws. In this case, the driver may simply enable the LRZ depth testing (e.g., LRZEn=1) for all the applicable draws based on a depth function without actually tracking the depth direction.

In certain aspects, the GPU is responsible for disabling the LRZ (or keeping the LRZ enabled) automatically based on a detected depth buffer direction change. This may allow the driver and/or the GPU to use the LRZ depth testing more effectively in many possible scenarios. As shown below in Example 4, LRZ depth testing may be enabled for each draw command (e.g., LRZEn=1 for each of the 6 draws). That is, the driver may assume that LRZ depth testing will be performed, and the decision to disable LRZ depth testing may be made by the GPU.

In the case where command buffer 1 is executed before command buffer 2, the GPU may be responsible for detecting the depth buffer direction change(s). Thus, the GPU may store LESS in the status buffer (e.g., per Draw1) and compare the value LESS stored in the status buffer to each of the remaining 5 draws (e.g., or N−1 draws, given N draws). As indicated below, at Draw4, the GPU may detect that the direction in the depth direction buffer is now GREATER, and determine to disable LRZ depth testing for the remainder of the draws (e.g., for Draw4, Draw5, and Draw6).

Example 4

Command Buffer 1:
Draw1: Direction is LESS, LRZEn=1 LRZWriteEn=1; depthWrites=1;
Draw2: Direction is LESS, LRZEn=1 LRZWriteEn=1; depthWrites=1;
Draw3: Direction is LESS, LRZEn=1 LRZWriteEn=0; depthWrites=0;
Command Buffer 2:
Draw4: Direction is GREATER, LRZEn=1 LRZWriteEn=1; depthWrites=1;
Draw5: Direction is LESS, LRZEn=1 LRZWriteEn=1; depthWrites=1;
Draw6: Direction is LESS, LRZEn=1 LRZWriteEn=0; depthWrites=0.

In some cases, the GPU may re-enable the LRZ depth testing (e.g., LRZEn=1) for each bin (e.g., the bins 310, 311, 312, 313, 314, 315) within a frame. For example, if the LRZEn=0 after N draws in a set of draws after rendering for a first bin is completed, the GPU may reset LRZEn to 1 for processing the draws for the next bin.

In certain aspects, a separate LRZ status buffer is provided for each bin, or one or more LRZ status buffers include separate entries for each bin. For example, device 104 (e.g., processing unit 120) may include one or more LRZ status buffers.

In certain aspects, a GPU may process draw commands for different bins of a frame in parallel, or in an order where some draw commands are processed across bins prior to all the draw commands being processed for a given bin for a frame. For example, assume that for bin 310, there are a total of 1000 draw commands to be processed for a frame. The GPU may, for example, first process draw commands 1-500, and then move on to processing draw commands for another bin, such as bin 311. The GPU may later return to processing draw command 501 for bin 310. Accordingly, by keeping separate information for the LRZ status buffer for each bin, the GPU can later check whether LRZ depth testing was previously disabled for bin 310 for the current frame or not, and if not, it can check whether there is a depth buffer direction change between draw command 500 and draw command 501 of bin 310 to determine whether to disable use of the LRZ depth status buffer for bin 310.

Further, in certain aspects, enabling/disabling of use of a LRZ depth buffer is performed on a bin by bin basis within a frame. For example, disabling of the LRZ depth buffer in one bin, does not affect whether the LRZ depth buffer is used for another bin. Further, in certain aspects, enabling/disabling of use of a LRZ depth buffer is performed on a frame by frame basis, meaning that if use of a LRZ depth buffer is disabled in one frame for certain bins, it is re-enabled for the next frame.

Figure 4:
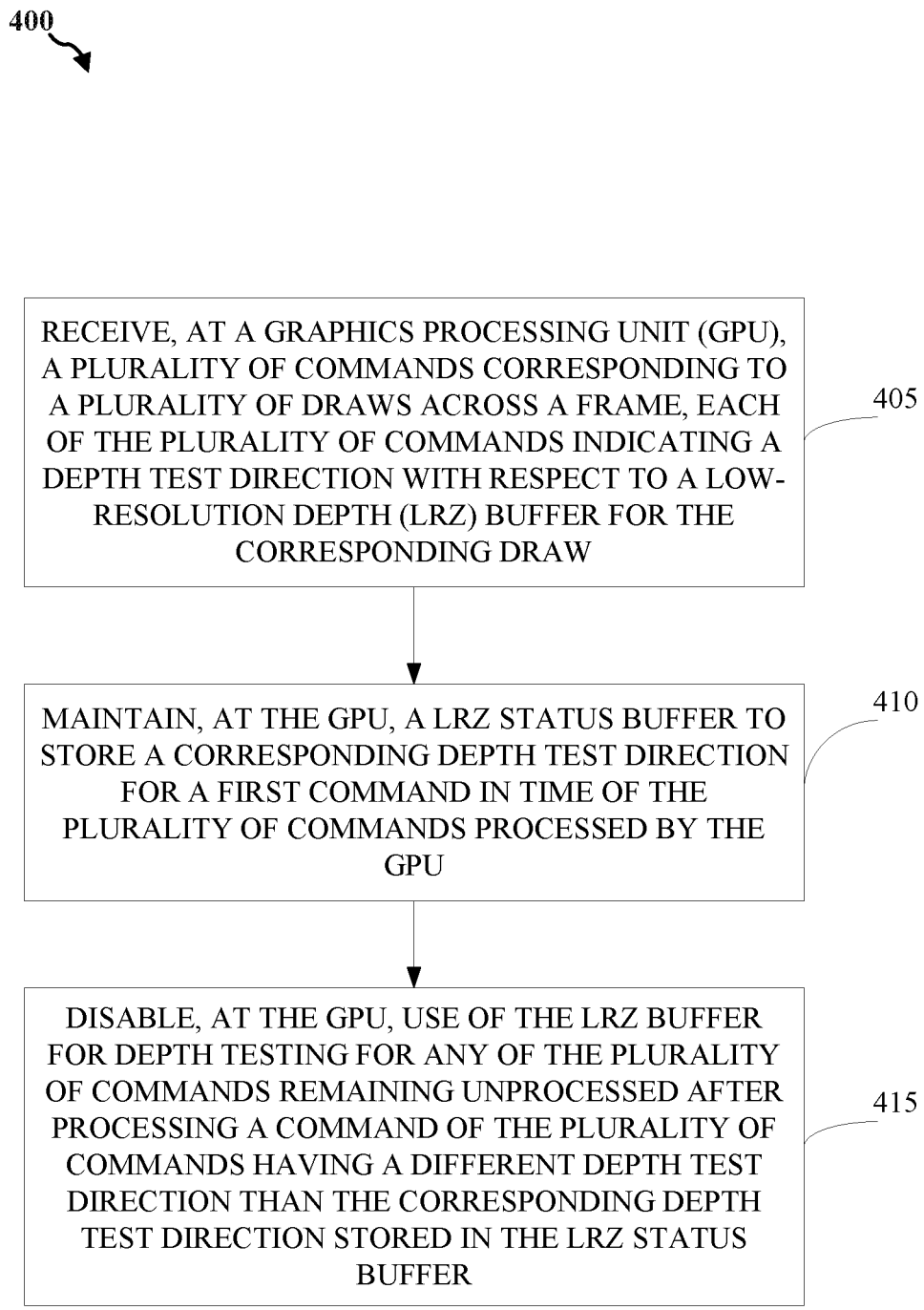
FIG. 4 illustrates a flow diagram of example operations for low-resolution (LRZ) depth testing by a graphics processing unit (GPU), in accordance with certain aspects of the present disclosure.

FIG. 4 is an example flow diagram illustrating example operations 400 for LRZ depth testing by a GPU. In certain aspects, the operations 400 may be performed by a GPU, such as in the graphics processing pipeline 107 of the processing unit 120 of FIG. 1.

The operations may begin, at 405, by the GPU receiving a plurality of commands corresponding to a plurality of draws across a frame, each of the plurality of commands indicating a depth test direction with respect to a LRZ buffer for the corresponding draw. For example, each of the plurality of commands is received from a driver and includes an indication that use of the LRZ buffer for depth testing should be enabled for the corresponding draw. In this case, the GPU receives the plurality of commands from a plurality of command buffers.

At 410, the GPU maintains a LRZ status buffer to store a corresponding depth test direction for a first command in time of the plurality of commands processed by the GPU.

At 415, the GPU disables use of the LRZ buffer for depth testing for any of the plurality of commands remaining unprocessed after processing a command of the plurality of commands having a different depth test direction than the corresponding depth test direction stored in the LRZ status buffer. The GPU may, in some cases, execute each of the plurality of draws. Additionally or alternatively, the GPU may re-enable use of the LRZ buffer for depth testing for a second frame.

In some cases, the use of the LRZ buffer for depth testing may be disabled based on factors other than a depth direction change. For example, if use of the LRZ buffer is enabled for a first draw, (e.g., Draw1), the use of the LRZ buffer for a second draw (e.g., Draw2) may be disabled by the GPU if depth writes (e.g., depthWrite=0) are turned off, regardless of whether there is any depth direction change. In this case, the GPU may determine to re-enable use of the LRZ buffer for a third draw (e.g., Draw3), even though all the draws may be for the same bin in the same frame. In other words, the GPU may disable the use of the LRZ buffer for depth testing based on processing a given command indicating to disable depth testing, and then re-enable the use of the LRZ buffer for depth testing for at least one command processed subsequent to that given command.

In another case, the GPU may determine to re-enable the use of the LRZ buffer (e.g., for a given bin of a given frame) after it is disabled based on a depth direction change (e.g., for the given bin of the given frame), for example, based on the GPU receiving (and processing) a depth clear command after such disabling. In particular, based on the depth clear command, the LRZ buffer is cleared (and subsequently updated with a new value, such as for the bin of the frame). In this case, even if there is a depth direction change, the GPU can still re-enable the use of the LRZ buffer after the depth clear command, such as for the bin of the frame. For example, a Draw1 command may enable use of the LRZ buffer. Further, a Draw2 command may disable use of the LRZ buffer based on a depth direction change. Further, a depth clear command is received after Draw2. Thus, for Draw3 after the depth clear command, the GPU may re-enable the LRZ buffer. All such draws may be for the same bin of the same frame.

In certain aspects, the GPU compares a corresponding depth test direction of each of one or more commands including the command to the corresponding depth test direction stored in the LRZ status buffer. In this case, disabling the use of the LRZ buffer is in response to the comparing.

In some cases, the GPU disables the use of the LRZ buffer by disabling the use of the LRZ buffer for the command and each of the plurality of commands processed subsequent in time to the command.

In certain aspects, the frame may include multiple bins corresponding to different portions of the frame, the GPU receives a corresponding plurality of commands for each of the multiple bins, and the GPU maintains a corresponding LRZ status buffer for each of the multiple bins. In this case, use of the LRZ buffer for depth testing is independently disabled for each of the multiple bins.

In certain aspects, operations 400 further include comparing a corresponding depth test direction of each of one or more commands including the command to the corresponding depth test direction stored in the LRZ status buffer, wherein disabling the use of the LRZ buffer is in response to the comparing.

In certain aspects of operations 400, disabling the use of the LRZ buffer at 415 includes disabling the use of the LRZ buffer for the command and each of the plurality of commands processed subsequent in time to the command.

In certain aspects of operations 400, the frame includes multiple bins corresponding to different portions of the frame. In this case, the GPU receives a corresponding plurality of commands for each of the multiple bins and maintains a corresponding LRZ status buffer for each of the multiple bins. In certain aspects of operations 400, use of the LRZ buffer for depth testing is independently disabled for each of the multiple bins.

In certain aspects of operations 400, each of the plurality of commands is received from a driver and includes an indication that use of the LRZ buffer for depth testing should be enabled for the corresponding draw. In certain aspects of operations 400, the GPU receives the plurality of commands from a plurality of command buffers.

In certain aspects, operations 400 further include executing each of the plurality of draws.

In certain aspects, operations 400 further include re-enabling use of the LRZ buffer for depth testing for a second frame.

In certain aspects, prior to the disabling at 415, operations 400 further include disabling use of the LRZ buffer for depth testing based on processing a given command indicating to disable depth testing, and then re-enabling use of the LRZ buffer for depth testing for at least one command processed subsequent to the given command.

In certain aspects, after the disabling at 415, operations 400 further include re-enabling use of the LRZ buffer for depth testing based on processing a depth clear command.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for receiving, at a GPU, a plurality of commands corresponding to a plurality of draws across a frame, each of the plurality of commands indicating a depth test direction with respect to a LRZ buffer for the corresponding draw. The apparatus may include means for maintaining, at the GPU, a LRZ status buffer to store a corresponding depth test direction for a first command in time of the plurality of commands processed by the GPU. The apparatus may include means for disabling, at the GPU, use of the LRZ buffer for depth testing for any of the plurality of commands remaining unprocessed after processing a command of the plurality of commands having a different depth test direction than the corresponding depth test direction stored in the LRZ status buffer. The apparatus may include means for comparing a corresponding depth test direction of each of one or more commands including the command to the corresponding depth test direction stored in the LRZ status buffer, wherein disabling the use of the LRZ buffer is in response to the comparing. The apparatus may include means for executing each of the plurality of draws. The apparatus may include means for re-enabling use of the LRZ buffer for depth testing for a second frame.

The subject matter described herein can be implemented to realize one or more benefits or advantages. For instance, the described graphics processing techniques can be used by a GPU, a CPU, or some other processor that can perform graphics processing to implement the state information techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
receiving, at a graphics processing unit (GPU), a plurality of commands corresponding to a plurality of draws across a frame, each of the plurality of commands indicating a depth test direction with respect to a low-resolution depth (LRZ) buffer for the corresponding draw;
maintaining, at the GPU, a LRZ status buffer to store a corresponding depth test direction for a first command in time of the plurality of commands processed by the GPU; and
disabling, at the GPU, use of the LRZ buffer for depth testing for any of the plurality of commands remaining unprocessed after processing a command of the plurality of commands having a different depth test direction than the corresponding depth test direction stored in the LRZ status buffer.

2. The method of claim 1, further comprising comparing a corresponding depth test direction of each of one or more commands including the command to the corresponding depth test direction stored in the LRZ status buffer, wherein disabling the use of the LRZ buffer is in response to the comparing.

3. The method of claim 1, wherein disabling the use of the LRZ buffer comprises disabling the use of the LRZ buffer for the command and each of the plurality of commands processed subsequent in time to the command.

4. The method of claim 1, wherein the frame comprises multiple bins corresponding to different portions of the frame, wherein the GPU receives a corresponding plurality of commands for each of the multiple bins, wherein the GPU maintains a corresponding LRZ status buffer for each of the multiple bins.

5. The method of claim 4, wherein use of the LRZ buffer for depth testing is independently disabled for each of the multiple bins.

6. The method of claim 1, wherein each of the plurality of commands is received from a driver and includes an indication that use of the LRZ buffer for depth testing should be enabled for the corresponding draw.

7. The method of claim 6, wherein the GPU receives the plurality of commands from a plurality of command buffers.

8. The method of claim 1, further comprising executing each of the plurality of draws.

9. The method of claim 1, further comprising re-enabling use of the LRZ buffer for depth testing for a second frame.

10. The method of claim 1, further comprising, prior to the disabling the use of the LRZ buffer for depth testing:
disabling use of the LRZ buffer for depth testing based on processing a given command indicating to disable depth testing, and then re-enabling use of the LRZ buffer for depth testing for at least one command processed subsequent to the given command.

11. The method of claim 1, further comprising, after the disabling the use of the LRZ buffer for depth testing:
re-enabling use of the LRZ buffer for depth testing based on processing a depth clear command.

12. An apparatus for graphics processing, comprising:
a low-resolution depth (LRZ) buffer;
a LRZ status buffer; and
a graphics processing unit (GPU) configured to:
receive a plurality of commands corresponding to a plurality of draws across a frame, each of the plurality of commands indicating a depth test direction with respect to the LRZ buffer for the corresponding draw;
maintain the LRZ status buffer to store a corresponding depth test direction for a first command in time of the plurality of commands processed by the GPU; and
disable use of the LRZ buffer for depth testing for any of the plurality of commands remaining unprocessed after processing a command of the plurality of commands having a different depth test direction than the corresponding depth test direction stored in the LRZ status buffer.

13. The apparatus of claim 12, wherein the GPU is further configured to compare a corresponding depth test direction of each of one or more commands including the command to the corresponding depth test direction stored in the LRZ status buffer, wherein disabling the use of the LRZ buffer is in response to the comparison.

14. The apparatus of claim 12, wherein disabling the use of the LRZ buffer comprises disabling the use of the LRZ buffer for the command and each of the plurality of commands processed subsequent in time to the command.

15. The apparatus of claim 12, wherein the frame comprises multiple bins corresponding to different portions of the frame, wherein the GPU receives a corresponding plurality of commands for each of the multiple bins, wherein the GPU maintains a corresponding LRZ status buffer for each of the multiple bins.

16. The apparatus of claim 15, wherein use of the LRZ buffer for depth testing is independently disabled for each of the multiple bins.

17. The apparatus of claim 12, wherein each of the plurality of commands is received from a driver and includes an indication that use of the LRZ buffer for depth testing should be enabled for the corresponding draw.

18. The apparatus of claim 17, wherein the GPU receives the plurality of commands from a plurality of command buffers.

19. The apparatus of claim 12, wherein the GPU is further configured to execute each of the plurality of draws.

20. The apparatus of claim 12, wherein the GPU is further configured to re-enable use of the LRZ buffer for depth testing for a second frame.

21. The apparatus of claim 12, wherein the GPU is further configured to, prior to the disabling the use of the LRZ buffer for depth testing:
disable use of the LRZ buffer for depth testing based on processing a given command indicating to disable depth testing, and then re-enable use of the LRZ buffer for depth testing for at least one command processed subsequent to the given command.

22. The apparatus of claim 12, wherein the GPU is further configured to, after the disabling the use of the LRZ buffer for depth testing:
re-enable use of the LRZ buffer for depth testing based on processing a depth clear command.

23. A computing device for graphics processing, comprising:
a central processing unit (CPU);
a display;
a low-resolution depth (LRZ) buffer;
a LRZ status buffer; and
a graphics processing unit (GPU) configured to:
receive a plurality of commands from the CPU, the plurality of commands corresponding to a plurality of draws across a frame for display on the display, each of the plurality of commands indicating a depth test direction with respect to the LRZ buffer for the corresponding draw;
maintain the LRZ status buffer to store a corresponding depth test direction for a first command in time of the plurality of commands processed by the GPU; and
disable use of the LRZ buffer for depth testing for any of the plurality of commands remaining unprocessed after processing a command of the plurality of commands having a different depth test direction than the corresponding depth test direction stored in the LRZ status buffer.

24. The computing device of claim 23, wherein the GPU is further configured to compare a corresponding depth test direction of each of one or more commands including the command to the corresponding depth test direction stored in the LRZ status buffer, wherein disabling the use of the LRZ buffer is in response to the comparison.

25. The computing device of claim 23, wherein disabling the use of the LRZ buffer comprises disabling the use of the LRZ buffer for the command and each of the plurality of commands processed subsequent in time to the command.

26. The computing device of claim 23, wherein the frame comprises multiple bins corresponding to different portions of the frame, wherein the GPU receives a corresponding plurality of commands for each of the multiple bins, wherein the GPU maintains a corresponding LRZ status buffer for each of the multiple bins.

27. The computing device of claim 26, wherein use of the LRZ buffer for depth testing is independently disabled for each of the multiple bins.

28. The computing device of claim 23, wherein each of the plurality of commands is received from a driver and includes an indication that use of the LRZ buffer for depth testing should be enabled for the corresponding draw.

29. The computing device of claim 28, wherein the GPU receives the plurality of commands from a plurality of command buffers.

30. The computing device of claim 23, wherein the GPU is further configured to execute each of the plurality of draws.

31. The computing device of claim 23, wherein the GPU is further configured to re-enable use of the LRZ buffer for depth testing for a second frame.

32. The computing device of claim 23, wherein the GPU is further configured to, prior to the disabling the use of the LRZ buffer for depth testing:
  disable use of the LRZ buffer for depth testing based on processing a given command indicating to disable depth testing, and then re-enable use of the LRZ buffer for depth testing for at least one command processed subsequent to the given command.

33. The computing device of claim 23, wherein the GPU is further configured to, after the disabling the use of the LRZ buffer for depth testing:
  re-enable use of the LRZ buffer for depth testing based on processing a depth clear command.

* * * * *